Jan. 3, 1956  D. C. BLANCHARD  2,729,113
SECTIONAL HOUSING FOR JACKSCREW OPERATORS
Filed Oct. 28, 1954
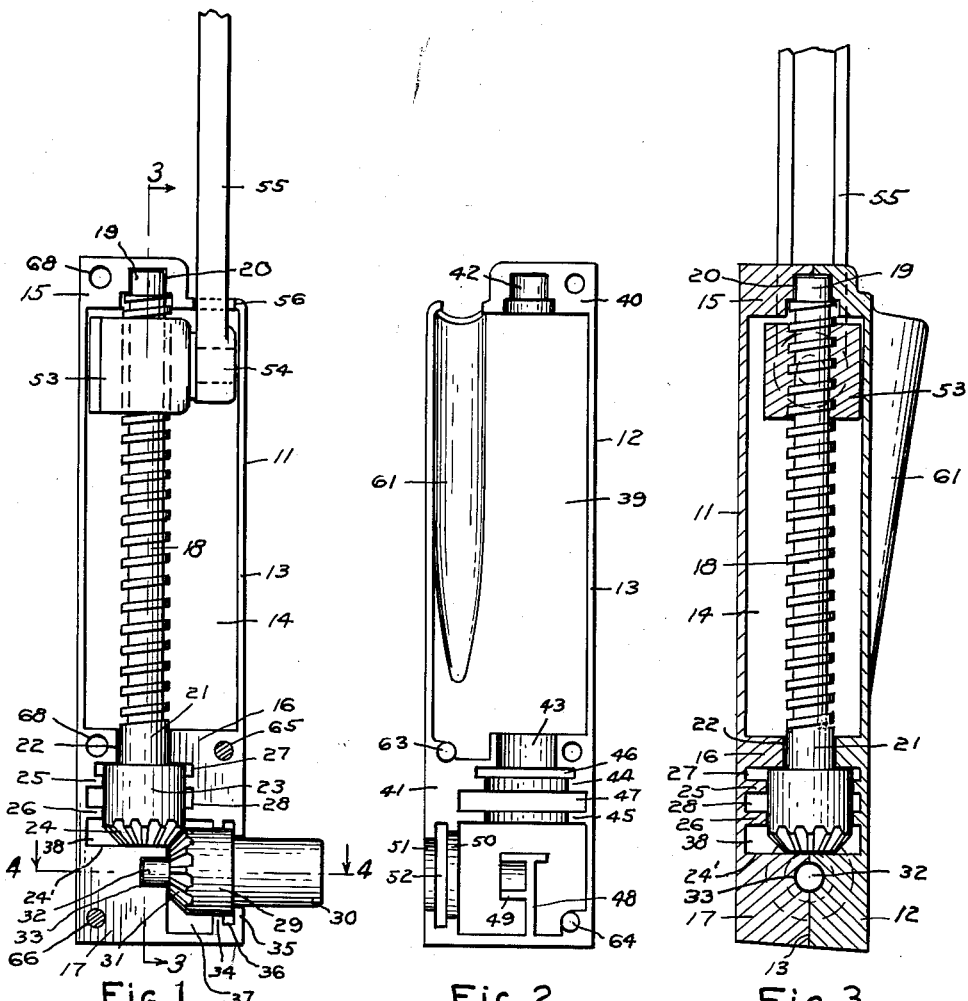
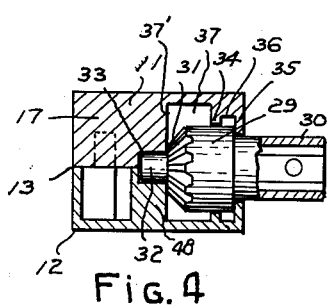
INVENTOR.
DONN C. BLANCHARD,
BY
ATTORNEY.

United States Patent Office 2,729,113
Patented Jan. 3, 1956

2,729,113

SECTIONAL HOUSING FOR JACKSCREW OPERATORS

Donn C. Blanchard, Miami, Fla., assignor to Stanley Building Specialties Company, North Miami, Fla., a corporation of Florida Application October 28, 1954, Serial No. 465,318

4 Claims. (Cl. 74—417)

My invention relates to sectional bearing forming means for jackscrew operators of jalousie and awning type windows.

An important object of the invention is to provide a sectional housing which will produce the bearing means and which may be die castings.

A further object of the invention is to provide a construction of the above-mentioned character which is simplified and will afford adequate support for the gears and the jackscrew.

Other objects and advantages of the invention will be apparent during the course of the following description.

In the accompanying drawings forming a part of this application and in which like numerals are employed to designate like parts throughout same:

Figure 1 is a side elevation of an inner die casting, the gears and jackscrew being in place;

Figure 2 is a side elevation of the companion die casting, the gears and jackscrew being omitted;

Figure 3 is a vertical longitudinal section taken on line 3—3 of Figure 1; and

Figure 4 is a horizontal section taken on line 4—4 of Figure 1.

In the drawings, where for the purpose of illustration is shown a preferred embodiment of the invention, the numeral 10 designates a casing as a whole, comprising companion die castings in the form of casing sections 11 and 12 having meeting edges 13. The die casting casing section 11 includes a main recess 14, and blocks 15, 16 and 17. The numeral 18 designates a jackscrew, having a cylindrical end 19, journaled in a semi-cylindrical bearing recess 20, formed in the block 15. The jackscrew has a cylindrical collar 21, journaled in a semi-cylindrical bearing recess 22, formed in the block 16. The numeral 23 designates a cylindrical head integral with a bevel gear 24. The head 23 is rigidly secured to the end of the jackscrew which extends beyond the sleeve 21, by any suitable means, such as having an opening formed therein to receive the end of the jackscrew which has a press fit within the cyindrical head. The head 23 may be rigidly secured to the shaft 18 and sleeve 21, by any suitable means, as stated. The cylindrical head 23 is mounted within semi-cylindrical bearing flanges 25 and 26, formed in the block 16, and there are semi-cylindrical recesses or grooves 27 and 28, for receiving lubricant. The end of the head 23 contacts with the end wall of the groove 27 and the end of the bevel gear 24 contacts with the end wall 24'.

Arranged at right angles to the head 23 is a cylindrical head 29, formed integral with the sleeve 30. This head has a bevel gear 31 formed integral with its forward end and a cylindrical extension 32 is also integral with the head 29. This extension 32 extends into a semi-cylindrical bearing recess 33 formed in the block 16. The cylindrical head 29 has engagement within semi-cylindrical bearing flanges 34 and 35, formed in the block 17 and a semi-cylindrical groove 36 is provided for the lubricant. The block also has a large recess 37 for holding a lubricant and within which the bevel gear 31 operates and this large recess leads into a second large recess 38 in which the bevel gear 24 operates. These large recesses are adapted to contain lubricant. The head contacts with the end wall of the groove 36 and with the end wall 37'.

The companion die casting casing section 12, Figure 5, has a main recess 39, and a block 40 at one end and a block 41 near and spaced from its opposite end. The block 40 is provided with a semi-cylindrical bearing recess 42, to receive the end 19 of the jackscrew. The recesses 20 and 42 constitute a complete bearing for this end 19 of the jackscrew. The block 41 has a semi-cylindrical bearing recess 43, to receive the sleeve 21, the bearing recesses 22 and 43 constituting a complete bearing for the sleeve 21. The block 41 has semi-cylindrical bearing flanges 44 and 45, receiving the cylindrical head 23. The flanges 44 and 25 form a complete cylindrical bearing for the head 23 and the flanges 45 and 26 form a complete cylindrical bearing for this head 23. Arranged between the bearing recess 43 and the flange 44 is a semi-cylindrical groove 46, to register with the groove 27, and 47 is a semi-cylindrical groove to register with the groove 28. These grooves, when assembled, form continuous annular grooves for receiving lubricant. Formed integral with the lower end of the casing section 12 is a vertical web 48, provided upon one side with a semi-cylindrical bearing flange 49 to receive the shaft extension 32 and registering with the recess 33, to form a complete bearing for the shaft extension. The casing section 12 is provided at one longitudinal edge with semi-cylindrical bearing flanges 50 and 51, having a semi-cylindrical groove 52 between them. The groove 52 will register with the groove 36. The bearing flange 51 will register with the bearing flange 35 to form a complete cylindrical bearing for the sleeve 30 and the bearing flange 50 will register with the bearing flange 34 to form a complete cylindrical bearing for the head 29. The outer end of the sleeve 29 contacts with the end wall of the groove 52 and the bevel gear 31 contacts with the flange 49.

The gear 31 engages and drives the gear 24. These gears are positively held against longitudinal movement and remain in permanent mesh.

Mounted upon the jackscrew 18 is a traveling nut 53, operating within the recess formed by the assembled recess sections 14 and 39. This nut has pivotal connection at 54, with the crank arm 55, extending upwardly to the exterior of the casing through an opening 56.

It is preferred to use two operating units including the jackscrews 18, near the opposite sides of the window. It is therefore preferred to simultaneously turn the gears 31 and for this purpose a shaft having non-cylindrical ends are inserted within the recesses formed in the sleeves 30. Means are disposed intermediate of the window whereby the non-cylindrical shafts are simultaneously controlled.

The casing sections 10 and 12 are held in registration, by studs 63 and 64 that are press fitted into openings 65 and 66 respectively, formed in the block 16. The assembled casing sections are rigidly secured to the jamb section of the window by suitable screws which pass through threaded openings 68 formed in the casing sections 11 and 12.

In view of the foregoing description, it is apparent that when the casing sections are assembled, they provide a casing forming bearing means which adequately supports the gear elements and the shafts associated therewith, and also provide means for holding a lubricant in proximity to the gears and parts thereof. When the gear 31 is rotated, it rotates gear 24, rotating jackscrew 18, which will move the nut 53 vertically, as is obvious.

It is to be understood that the form of the invention herewith shown and described is to be taken as a preferred embodiment of the same and that various changes

Having thus described my invention, I claim:

1. A bearing forming device, comprising companion casing sections to be arranged opposite to each other, said casing sections including blocks disposed at corresponding ends of the casing sections, said blocks having bearing recesses, said casing sections including blocks arranged near their opposite corresponding ends, the second-named blocks being provided near their inner ends with bearing recesses, the second-named blocks being provided outwardly of their bearing recesses with bearing flanges, said casing sections having gear receiving recesses outwardly of the second-named blocks, a jackscrew extending longitudinally within the casing sections and having an outer end journaled within the bearing recesses of the first-named blocks, a sleeve carried by the jackscrew near its opposite end, a head secured to the sleeve, a bevel gear carried by the head, the sleeve being journaled in the bearing recesses of the second-named blocks and the head being journaled in the bearing flanges of the second-named blocks and the bevel gear operating within the gear receiving recess, a second sleeve, a second head carried by the second sleeve, and a second bevel gear carried by the second head and engaging the first-named bevel gear, the second head being arranged at substantially a right angle to the first head, and bearing means arranged within said casing sections and receiving the second sleeve and second head.

2. A bearing forming device, comprising companion casing sections to be arranged opposite to each other, said casing sections including blocks disposed near corresponding ends of said casing sections, said blocks having bearing recesses, said casing sections including blocks arranged near their opposite corresponding ends, the second-named blocks being provided near their inner ends with bearing recesses, the second-named blocks being provided outwardly of their bearing recesses with transverse bearing flanges, said casing sections having transverse gear receiving recesses disposed next to the second-named blocks, said casing sections being provided near said opposite ends with longitudinal gear receiving recesses and longitudinal bearing flanges, a jackscrew extending longitudinally within the casing sections and having an outer end journaled within the bearing recesses of the first-named blocks, a sleeve carried by the jackscrew near its opposite end, a head secured to the sleeve, a bevel gear carried by the head, said sleeve being journaled in the bearing recesses of the second-named blocks and the head being journaled in the transverse bearing flanges and the bevel gear operating within the transverse gear receiving recess, a second sleeve, a second head carried by the second sleeve, and a second bevel gear carried by the second head and engaging the first-named bevel gear, the second head being arranged at substantially a right angle to the first-named head, the second sleeve being journaled within the outer longitudinal bearing flanges and the second head journaled within the inner longitudinal bearing flanges, and the second bevel gear operating within the longitudinal gear receiving recess.

3. A bearing forming device, comprising companion casing sections which are oppositely arranged, a jackscrew extending longitudinally within the casing sections, a bevel gear secured to one end of the jackscrew, a shaft extending transversely of the casing sections, a second bevel gear carried by the transverse shaft and engaging the first-named bevel gear, bearing means arranged within the casing sections for receiving the ends of the jackscrew, said bearing means including elements integral with the casing sections and terminating substantially at the meeting faces of the casing sections, and bearing means arranged within the casing sections for receiving the transverse shaft, the second-named bearing means including members terminating substantially at the meeting faces of the casing sections.

4. A bearing forming device, comprising companion casing sections which are oppositely arranged and have meeting faces, a jackscrew extending longitudinally within the casing sections, a bevel gear secured to the jackscrew, a transverse shaft extending into said casing, a second bevel gear carried by the transverse shaft and engaging the first-named bevel gear, bearing means within the casing sections for receiving the jackscrew, said bearing means including elements integral with the casing sections, said elements extending substantially to the meeting faces, the elements of one casing section being separate from the elements of the other casing section, and bearing means arranged within the casing sections for receiving the transverse shaft.

References Cited in the file of this patent

UNITED STATES PATENTS

| | | |
|---|---|---|
| 655,489 | Hoff | Aug. 7, 1900 |
| 710,466 | Keenan | Oct. 7, 1902 |
| 1,137,491 | Joyce | Apr. 27, 1915 |